(12) United States Patent
Jung et al.

(10) Patent No.: US 11,230,321 B2
(45) Date of Patent: *Jan. 25, 2022

(54) BODY OF VEHICLE EQUIPPED WITH HIGH-VOLTAGE BATTERY

(71) Applicants:Hyundai Motor Company, Seoul (KR); KIA Motors Corporation, Seoul (KR)

(72) Inventors: Se Hoon Jung, Seoul (KR); Ki Bong Park, Incheon (KR); Young Tae Yang, Yongin-si (KR); Jun Seok Choi, Hwaseong-si (KR); Min Gyu Park, Hwaseong-si (KR); Ji Ho Choi, Hwaseong-si (KR); Byung Su Kim, Incheon (KR); Hyo Seop Cha, Seoul (KR); Hyeon Su Jin, Bucheon-si (KR); Dong Su Yang, Incheon (KR); Jin Won Kim, Pyeongtaek-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 122 days.

This patent is subject to a terminal disclaimer.

(21) Appl. No.: 16/878,977

(22) Filed: May 20, 2020

(65) Prior Publication Data
US 2021/0253168 A1    Aug. 19, 2021

(30) Foreign Application Priority Data
Feb. 13, 2020  (KR) .................... 10-2020-0017838

(51) Int. Cl.
*B60J 7/00* (2006.01)
*B62D 21/03* (2006.01)
(Continued)

(52) U.S. Cl.
CPC .............. *B62D 21/03* (2013.01); *B60K 1/04* (2013.01); *B62D 25/2036* (2013.01); *B60K 2001/0438* (2013.01); *B62D 21/15* (2013.01)

(58) Field of Classification Search
CPC ...... A61K 2300/00; H04W 4/70; H04W 4/46; A23V 2002/00; Y02E 60/10; Y02E 60/50;
(Continued)

(56) References Cited
U.S. PATENT DOCUMENTS

2007/0007054 A1*  1/2007  Nakashima .......... B62D 25/025
                                                  180/65.1
2019/0009661 A1*  1/2019  Okamura .............. H01M 50/20
(Continued)

FOREIGN PATENT DOCUMENTS

KR   1020120114638 A   10/2012

*Primary Examiner* — Kiran B Patel
(74) *Attorney, Agent, or Firm* — McDonnell Boehnen Hulbert & Berghoff LLP

(57) ABSTRACT

A body of a vehicle equipped with a high-voltage battery is disclosed. The vehicle body includes a rear cross member mounted below the rear side of the front seat so as to be oriented in the lateral direction of the vehicle body, a front cross member mounted in front of the rear cross member so as to be oriented in the lateral direction of the vehicle body, a high-voltage battery mounted between the front cross member and the rear cross member, and a plurality of longitudinal support members mounted to support the bottom of the high-voltage battery and to connect the front cross member and the rear cross member to each other in the longitudinal direction of the vehicle body.

10 Claims, 3 Drawing Sheets

(51) Int. Cl.
*B62D 25/20* (2006.01)
*B60K 1/04* (2019.01)
*B62D 21/15* (2006.01)

(58) Field of Classification Search
CPC ....... H01M 2300/0014; H01M 50/411; H01M 10/425
See application file for complete search history.

(56) References Cited

U.S. PATENT DOCUMENTS

| | | | |
|---|---|---|---|
| 2019/0359047 A1* | 11/2019 | Tsuyuzaki | B62D 25/2036 |
| 2020/0070671 A1* | 3/2020 | Ohkuma | B60L 50/66 |
| 2021/0101463 A1* | 4/2021 | Matsushima | B62D 25/025 |
| 2021/0101464 A1* | 4/2021 | Matsushima | B60K 1/04 |
| 2021/0104717 A1* | 4/2021 | Matsushima | H01M 50/20 |
| 2021/0179193 A1* | 6/2021 | Kim | B62D 25/025 |

* cited by examiner

BODY OF VEHICLE EQUIPPED WITH HIGH-VOLTAGE BATTERY

CROSS-REFERENCE TO RELATED APPLICATIONS

This application claims priority to Korean Patent Application No. 10-2020-0017838, filed on Feb. 13, 2020, in the Korean Intellectual Property Office, the disclosure of which is incorporated herein by reference in its entirety.

FIELD

The present disclosure relates to a body structure of a vehicle equipped with a high-voltage battery, such as an electric vehicle or a hybrid vehicle.

BACKGROUND

In general, an electric vehicle or a hybrid vehicle requires a high-voltage battery. However, since a high-voltage battery has a relatively large volume and weight and needs to be held in a waterproof environment, it is difficult to secure a mounting position and space for the high-voltage battery in a vehicle body.

Further, the vehicle body needs to have sufficient rigidity to withstand various kinds of external forces caused by, for example, collisions.

The information disclosed in this section is only for enhancement of understanding of the general background and should not be taken as an acknowledgement or any form of suggestion that this information forms the related art already known to a person skilled in the art.

SUMMARY

Therefore, the present disclosure has been made in view of the above problems, and it is an object of the present disclosure to provide a body of a vehicle equipped with a high-voltage battery, which is capable of enabling stable and firm mounting of the high-voltage battery thereto without reducing interior space in the vehicle for occupants, and which is increased in rigidity by the high-voltage battery mounted thereto, thereby reducing the extent to which the vehicle body is deformed by various kinds of external forces caused by, for example, collisions, and improving noise, vibration and harshness (NVH) performance, riding comfort, and steerability of the vehicle.

In accordance with the present disclosure, the above and other objects can be accomplished by the provision of a body of a vehicle equipped with a high-voltage battery, including a rear cross member mounted below the rear side of the front seat so as to be oriented in the lateral direction of the body, a front cross member mounted in front of the rear cross member so as to be oriented in the lateral direction of the body, and a plurality of longitudinal support members mounted to support the bottom of the high-voltage battery and to connect the front cross member and the rear cross member to each other in the longitudinal direction of the body, wherein the high-voltage battery is mounted between the front cross member and the rear cross member.

Each of the plurality of longitudinal support members may be mounted so as to be oriented in the longitudinal direction of the body and to be connected to the rear end of a front-side rear member, extending backwards in the longitudinal direction of the body from a front side member disposed at a front portion of the body.

Each of the front cross member and the rear cross member may be coupled at opposite ends thereof to side sills of the body.

The rear end of the front-side rear member, extending backwards in the longitudinal direction of the body from the front side member disposed at a front portion of the body, may be coupled to the front cross member, and each of the plurality of longitudinal support members may be connected to the rear end of the front-side rear member on the front cross member.

The high-voltage battery may include a tunnel portion extending along the longitudinal center axis of the body and formed so as to be recessed upwards and to be open downwards, and storage portions formed on opposite sides of the tunnel portion to accommodate battery modules constituting the high-voltage battery.

The tunnel portion may be configured to allow internal spaces in the storage portions to communicate with each other therethrough.

The body may further include a plurality of lateral support members configured to support the high-voltage battery, and the plurality of lateral support members may be provided under the high-voltage battery and may extend in the lateral direction of the body from the tunnel portion to the side sills of the body.

The storage portions of the high-voltage battery may be directly coupled to the side sills of the body.

The tunnel portion of the high-voltage battery may be formed narrower than each of the storage portions formed on opposite sides of the tunnel portion.

The tunnel portion of the high-voltage battery may be formed in the shape of an inverted U in cross-section so as to be open in the downward direction of the body.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
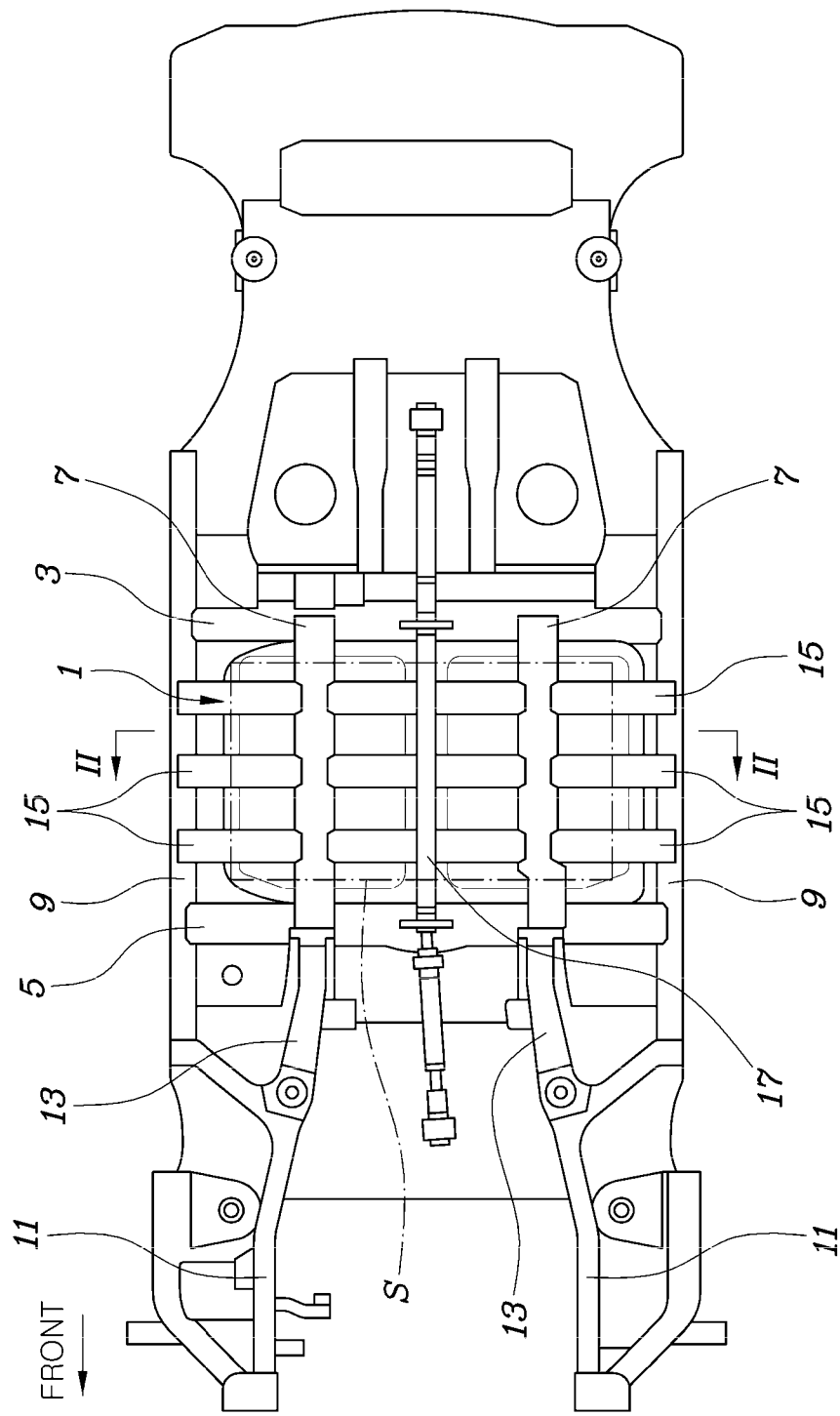
FIG. 1 is a view of a body of a vehicle equipped with a high-voltage battery according to the present disclosure when viewed from below.
Figure 2:
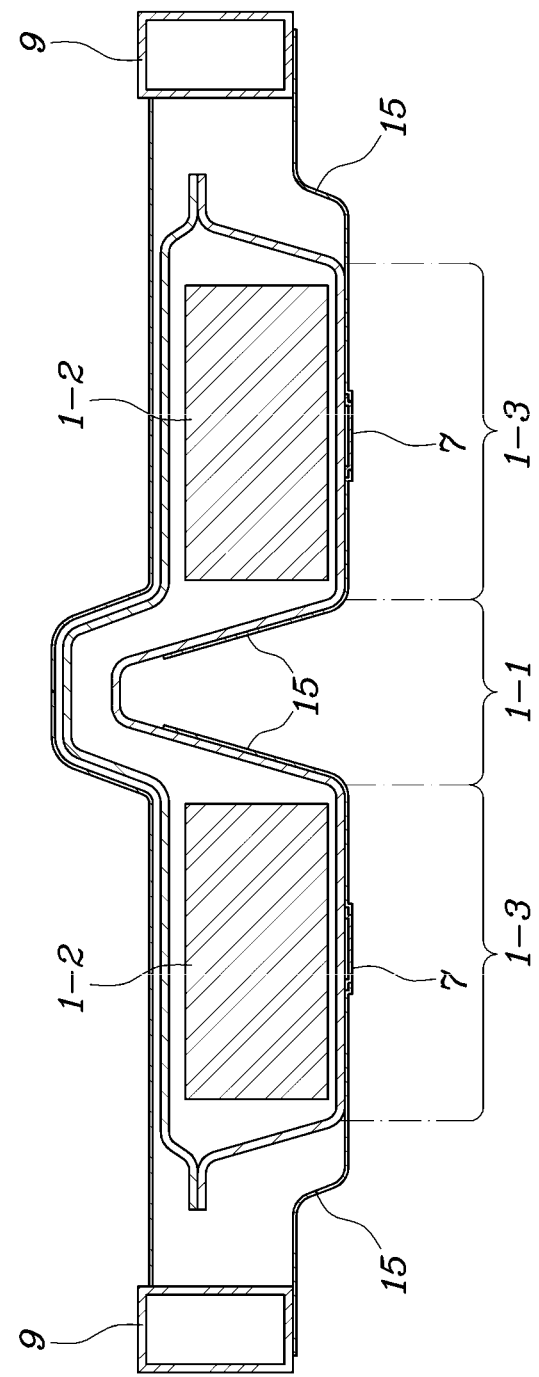
FIG. 2 is a cross-sectional view of the high-voltage battery taken along line II-II in FIG. 1.
Figure 3:
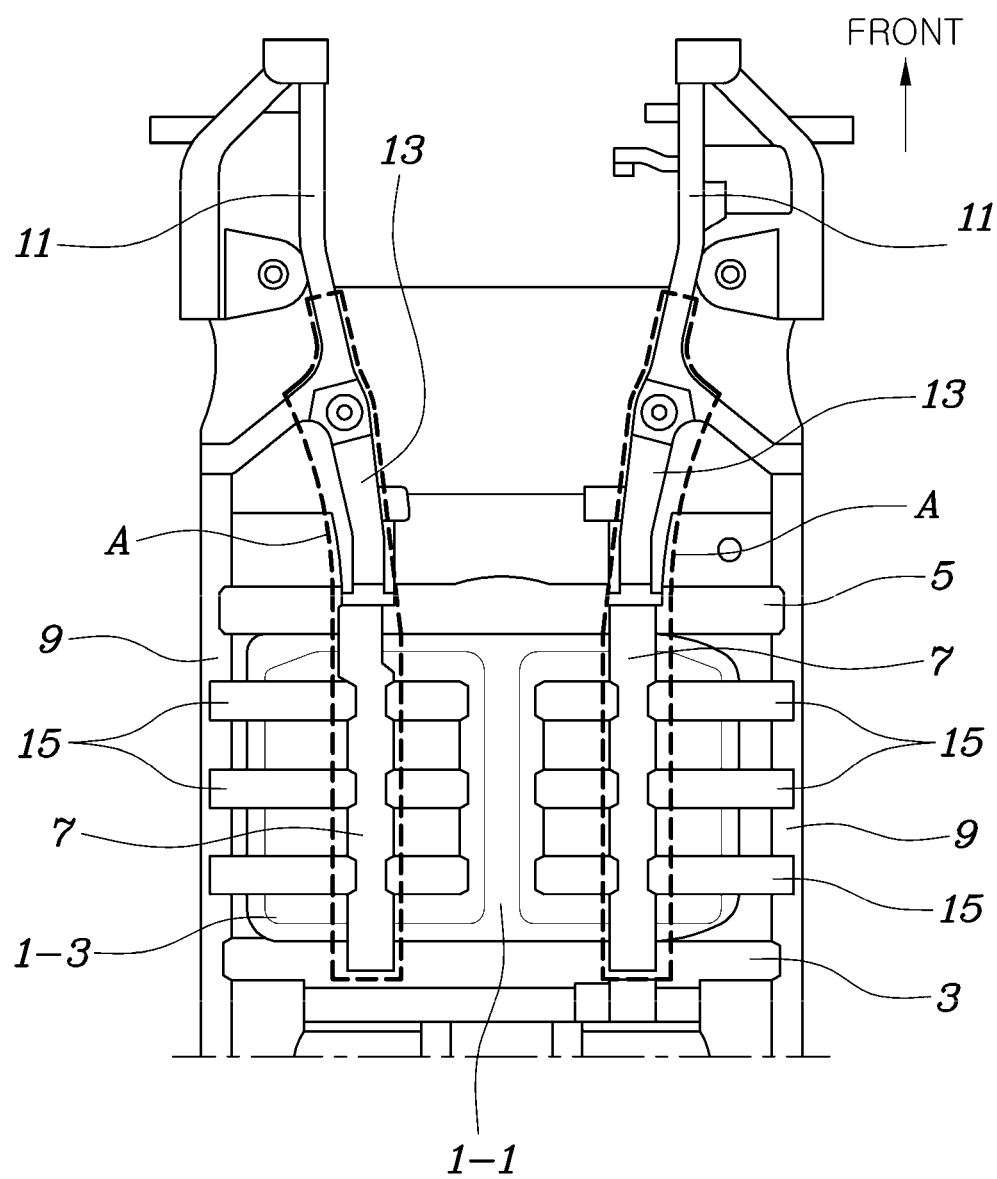
FIG. 3 is a view showing the structure for securing rigidity in the longitudinal direction of the vehicle body using a front-side rear member and a longitudinal support member shown in FIG. 1.

Referring to FIGS. 1 to 3, a body of a vehicle equipped with a high-voltage battery 1 according to the present disclosure includes a rear cross member 3, mounted below the rear side of a front seat S so as to be oriented in a lateral direction of the vehicle body, a front cross member 5 mounted in front of the rear cross member 3 so as to be oriented in the lateral direction of the vehicle body, and a plurality of longitudinal support members 7, mounted to support the bottom of the high-voltage battery 1 and to connect the front cross member 5 and the rear cross member 3 to each other in the longitudinal direction of the vehicle body. The high-voltage battery 1 is mounted between the front cross member 5 and the rear cross member 3.

Each of the front cross member 5 and the rear cross member 3 is directly coupled to side sills 9 of the vehicle body at opposite ends thereof.

Therefore, the high-voltage battery 1 is mounted in the planar space defined by the two side sills 9 mounted to opposite sides of the vehicle body, the front cross member 5, and the rear cross member 3. Accordingly, the high-voltage battery 1 is fundamentally protected from external forces by the above parts disposed around the high-voltage battery 1.

Each of the longitudinal support members 7 is mounted so as to be oriented in the longitudinal direction of the vehicle body and to be connected to the rear end of a front-side rear member 13, which extends backwards in the longitudinal direction of the vehicle body from a front side member 11, which is disposed at a front portion of the vehicle body.

Therefore, as shown in FIG. 3, the front-side rear member 13 and each of the longitudinal support members 7 serve as a rigid stiffener, which is elongated in the longitudinal direction of the vehicle body, as indicated by "A", thereby increasing the overall rigidity of the vehicle body in the longitudinal direction.

The rear end of the front-side rear member 13, which extends backwards in the longitudinal direction of the vehicle body from the front side member 11, which is disposed at the front portion of the vehicle body, is coupled to the front cross member 5. Each of the longitudinal support members 7 is connected to the rear end of the front-side rear member 13 on the front cross member 5.

Therefore, the coupling structure of the front-side rear member 13 and each of the longitudinal support members 7 may be more firmly secured on the front cross member 5.

The high-voltage battery 1 includes a tunnel portion 1-1, which extends along the longitudinal center axis of the vehicle body and is formed so as to be recessed upwards and to be open downwards, and storage portions 1-3, which are formed on opposite sides of the tunnel portion 1-1 to accommodate battery modules 1-2 constituting the high-voltage battery 1.

The tunnel portion 1-1 is configured to allow the internal spaces in the storage portions 1-3, formed on opposite sides of the tunnel portion 1-1, to communicate with each other therethrough, thereby enabling electrical connection between the battery modules 1-2 accommodated in the storage portions 1-3.

In the embodiment, as shown in FIG. 2, the tunnel portion 1-1 of the high-voltage battery 1 is formed in the shape of an inverted U in cross-section so as to be open in the downward direction of the vehicle body. Specifically, the tunnel portion 1-1 of the high-voltage battery 1 has two inverted U-shaped cross-sections, which are spaced vertically apart from each other to allow the storage portions 1-3 to communicate with each other through the gap therebetween.

The tunnel portion 1-1 itself serves to increase the rigidity of the high-voltage battery 1 due to the inverted U shape in cross-section thereof. In addition, the structure of the tunnel portion 1-1, in which two inverted U-shaped cross-sections are spaced vertically apart from each other by a predetermined gap, serves to further increase the rigidity of the high-voltage battery 1.

Therefore, when the high-voltage battery 1, which has the highly rigid structure described above, is connected to the front-side rear member 13, the front cross member 5, and the rear cross member 3 via each of the longitudinal support members 7, as described above, the high-voltage battery 1 itself serves to increase the rigidity of the vehicle body.

In addition, a plurality of lateral support members 15 for supporting the high-voltage battery 1 is provided under the high-voltage battery 1 so as to extend in the lateral direction of the vehicle body from the tunnel portion 1-1 to the side sills 9 of the vehicle body, whereby the high-voltage battery 1 is more securely supported by the vehicle body and the rigidity of the vehicle body is further increased.

However, the lateral support members 15 may be optionally provided. For example, the lateral support members 15 may be omitted, and flanges may be formed at the side surfaces of the storage portions 1-3 of the high-voltage battery 1, and may be directly coupled to the side sills 9 of the vehicle body.

The tunnel portion 1-1 of the high-voltage battery 1 may be formed narrower than each of the storage portions 1-3 formed on opposite sides of the tunnel portion 1-1 such that the volumes of the storage portions 1-3, i.e. the spaces for mounting the battery modules 1-2 therein, are made as large as possible.

In addition, in the case of a rear-wheel-drive vehicle, a power transmission part such as a drive shaft 17 may be mounted so as to pass through the space below the tunnel portion 1-1 of the high-voltage battery 1, an example of which is illustrated in FIG. 1.

As is apparent from the above description, the present disclosure provides a body of a vehicle equipped with a high-voltage battery, which is capable of enabling stable and firm mounting of the high-voltage battery thereto without reducing interior space in the vehicle for occupants, and which is increased in rigidity by the high-voltage battery mounted thereto, thereby reducing the extent to which the vehicle body is deformed by various kinds of external forces caused by, for example, collisions, and improving noise, vibration and harshness (NVH) performance, riding comfort, and steerability of the vehicle.

Although preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A body of a vehicle equipped with a high-voltage battery, the body comprising:
   a rear cross member mounted below a rear side of a front seat so as to be oriented in a lateral direction of the body;
   a front cross member mounted in front of the rear cross member so as to be oriented in the lateral direction of the body,
   wherein the high-voltage battery is mounted between the front cross member and the rear cross member; and
   a plurality of longitudinal support members mounted to support a bottom of the high-voltage battery and to connect the front cross member and the rear cross member to each other in a longitudinal direction of the body.

2. The body according to claim 1, wherein each of the plurality of longitudinal support members is mounted so as to be oriented in the longitudinal direction of the body and to be connected to a rear end of a front-side rear member, extending backwards in the longitudinal direction of the body from a front side member disposed at a front portion of the body.

3. The body according to claim 1, wherein each of the front cross member and the rear cross member is coupled at opposite ends thereof to side sills of the body.

4. The body according to claim 3, wherein a rear end of a front-side rear member, extending backwards in the longitudinal direction of the body from a front side member disposed at a front portion of the body, is coupled to the front cross member, and wherein each of the plurality of longitudinal support members is connected to the rear end of the front-side rear member on the front cross member.

5. The body according to claim 1, wherein the high-voltage battery comprises:

a tunnel portion extending along a longitudinal center axis of the body and formed so as to be recessed upwards and to be open downwards; and storage portions formed on opposite sides of the tunnel portion to accommodate battery modules constituting the high-voltage battery.

6. The body according to claim 5, wherein the tunnel portion is configured to allow internal spaces in the storage portions to communicate with each other therethrough.

7. The body according to claim 5, further comprising:

a plurality of lateral support members configured to support the high-voltage battery, wherein the plurality of lateral support members is provided under the high-voltage battery and extends in the lateral direction of the body from the tunnel portion to side sills of the body.

8. The body according to claim 5, wherein the storage portions of the high-voltage battery are directly coupled to side sills of the body.

9. The body according to claim 5, wherein the tunnel portion of the high-voltage battery is formed narrower than each of the storage portions formed on opposite sides of the tunnel portion.

10. The body according to claim 5, wherein the tunnel portion of the high-voltage battery is formed in a shape of an inverted U in cross-section so as to be open in a downward direction of the body.

* * * * *